United States Patent [19]

Christianson

[11] 4,085,667

[45] Apr. 25, 1978

[54] ATTIC EXHAUST SYSTEM

[76] Inventor: Neil B. Christianson, 10813 Broadwater Dr., Fairfax, Va. 22030

[21] Appl. No.: 771,497

[22] Filed: Feb. 24, 1977

[51] Int. Cl.² ............................................... F24F 7/02
[52] U.S. Cl. ................................. 98/43 R; 98/43 C; 60/641; 126/270; 52/199
[58] Field of Search .................. 98/43 R, 43 A, 43 C, 98/42 R, 42 A, 33 R, 32, 31; 60/641; 237/1 A; 126/270, 271; 52/198-200

[56] References Cited

U.S. PATENT DOCUMENTS

| 2,462,952 | 3/1949 | Dunkak | 126/271 |
|---|---|---|---|
| 3,203,167 | 8/1965 | Green, Jr. | 126/270 |
| 3,514,942 | 6/1970 | Kyryluk | 126/271 |
| 3,832,992 | 9/1974 | Trombe et al. | 126/270 |
| 3,894,345 | 7/1975 | Zeltmann | 126/270 |
| 4,051,769 | 10/1977 | Nickerson et al. | 60/641 |

Primary Examiner—John J. Camby
Assistant Examiner—Henry C. Yuen
Attorney, Agent, or Firm—Joseph E. Rusz; Richard J. Killoren

[57] ABSTRACT

An attic evacuation system having a solar energy transfer section supported on a roof with a spacer between the energy transfer section and the roof. Air from the attic passes through the energy transfer section through two flow channels. A turbine is provided in one of the flow channels and drives a compressor which supplies compressed air to the other flow channel. A plurality of energy absorbing blades are provided in the flow channel having the compressed air. A transparent window is provided in the energy transfer section adjacent the energy absorbing blades. A diffuser nozzle is provided at the end of the flow channel without the energy absorbing blades. The flow channel containing the energy absorbing blades has an ejector nozzle at the exit end thereof. The ejector nozzle flow is directed into the diffuser nozzle to entrain air to draw air through the turbine to drive the compressor.

4 Claims, 5 Drawing Figures

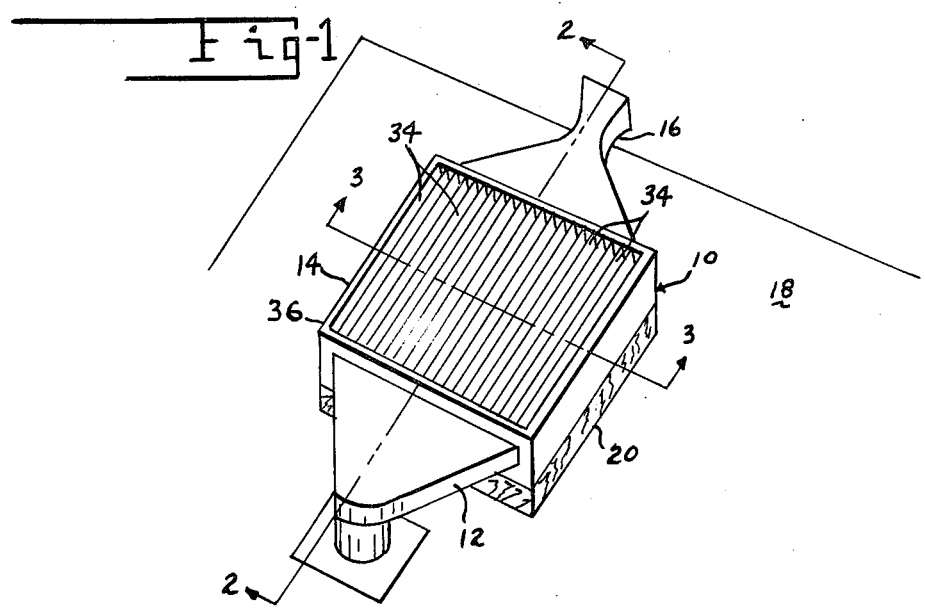
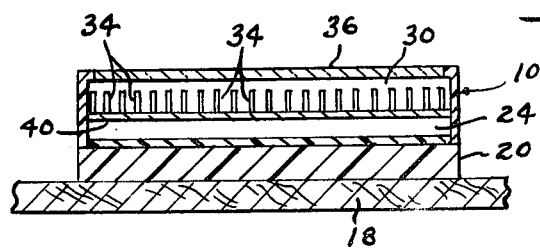
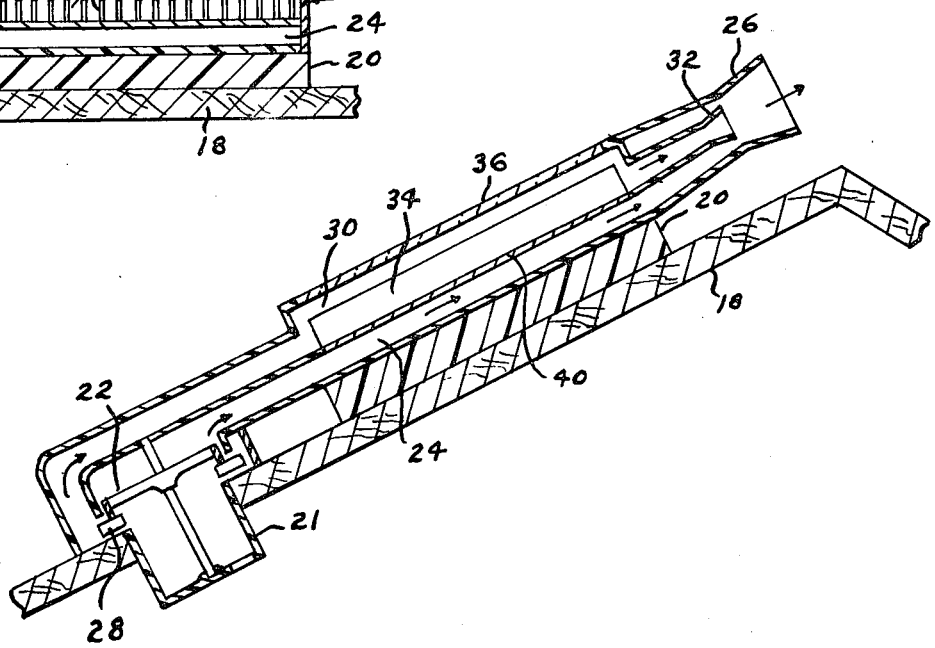

ATTIC EXHAUST SYSTEM

RIGHTS OF THE GOVERNMENT

The invention described herein may be manufactured and used by or for the Government of the United States for all governmental purposes without the payment of any royalty.

BACKGROUND OF THE INVENTION

Various apparatus has been provided for making use of solar energy to do useful work. The patents to Green, Jr., U.S. Pat. No. 3,203,167, and Kyryluk, U.S. Pat. No. 3,514,942, show two such systems. Conventional attic ventilation systems make use of electrical power to run fans for removing hot air from the attic. In turn, cool outside air is drawn in through vents to replace the air removed by the attic fan.

BRIEF SUMMARY OF THE INVENTION

According to this invention, a system is provided for removing heat from an attic with the use of solar radiation. A finned radiant heat absorbing apparatus is provided on the roof of a building. Solar radiation absorbed by the vaned radiant energy absorbing body is transferred by conduction and convection to air in contact with the vanes in a first flow channel. The unrestrained air expands causing a flow out through an ejector nozzle to entrain secondary air in a second flow channel. The air in the second flow channel is drawn through a turbine device and is further heated by heat transfer from the wall holding the vaned radiant energy absorbing body. The turbine device includes a radial compressor which raises the pressure in the first flow channel. The higher pressure plus heat in the first flow channel increases the exhaust velocity through the injector nozzle thus increasing the air flow through the turbine device. This continues until an equilibrium condition is reached.

IN THE DRAWINGS

FIG. 1 is an isometric view of an attic evacuation system according to the invention.

FIG. 2 is an enlarged sectional view taken along the line 2—2 of FIG. 1.

FIG. 3 is an enlarged sectional view taken along the line 3—3 of FIG. 1.

DETAILED DESCRIPTION OF THE INVENTION

Figure 4:
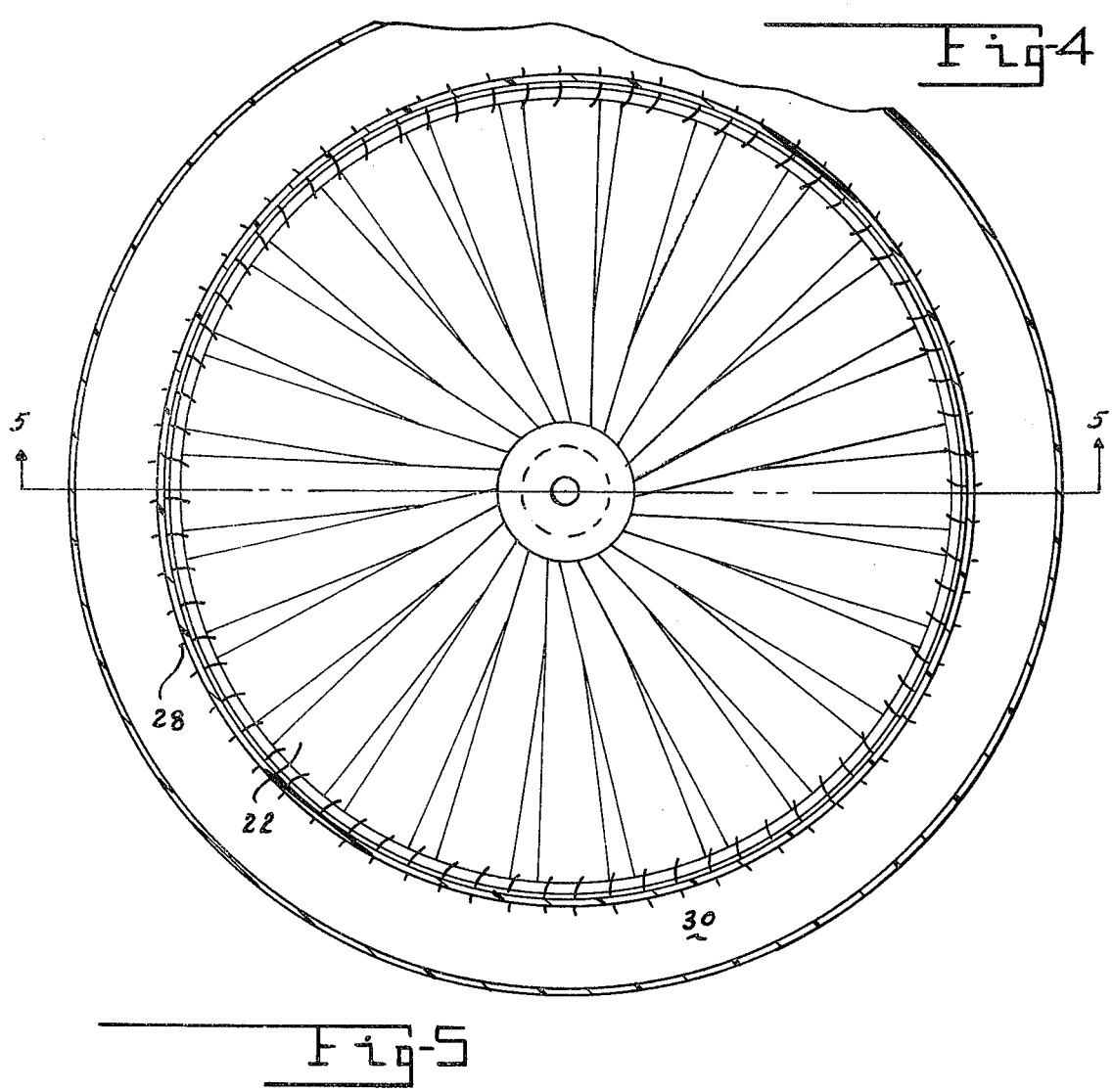
FIG. 4 is an enlarged top view of one turbine device which may be used with the device of FIG. 1.
Figure 5:
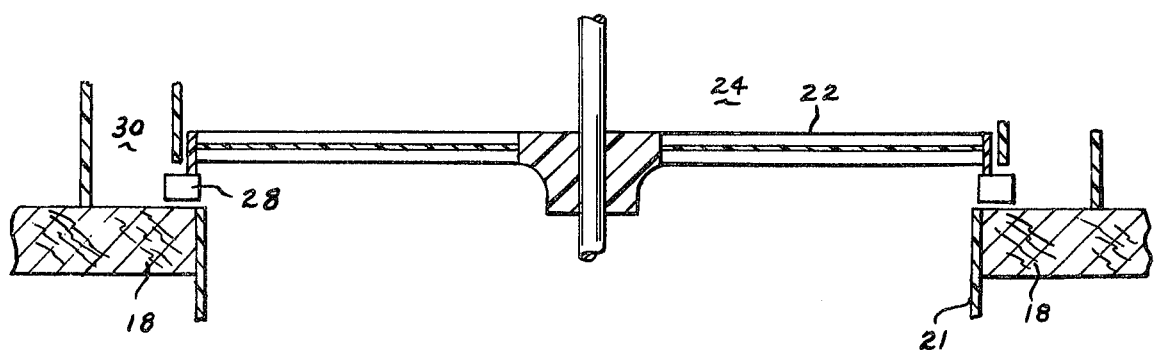
FIG. 5 is a sectional view of the device of FIG. 4 taken along the line 5—5.

Reference is now made to FIGS. 1, 2 and 3 of the drawing which show an attic evacuation system 10 having an attic exhaust section 12, a solar energy transfer section 14 and a nozzle section 16. The solar energy transfer section 14 is supported on the roof 18 on a support block 20. A first flow path from the attic is provided through attic vent opening 21, through turbine 22, through flow channel 24 and through the diffuser nozzle 26. A second flow path is provided from attic vent opening 21 through compressor 28, through flow channel 30, through ejector nozzle 32 into the diffuser nozzle 26. One turbine and compressor configuration which may be used is shown in greater detail in FIGS. 4 and 5.

A plurality of radiation absorbing vanes 34 are positioned in the flow channel 30 beneath a transparent window 36 in the energy transfer section 14. The vanes 34 are coated with an energy absorbing lampblock layer, not shown. The vanes 34 contact a wall 40 between channels 24 and 30 to provide energy transfer to air in channel 24. Since only low temperatures are present in most of the system, all parts, except the vanes 34 and wall 40, may be made of plastic or other low cost material. The blades 34 and wall 40 could be made of a metal, such as aluminum.

In the operation of the device, radiant energy passing through window 36 is absorbed by vanes 34 to heat up the vanes and also transfer some heat to wall 40. Air in channels 24 and 30 is heated and moves upward through diffuser nozzle 26 and ejector nozzle 32. Air leaving nozzle 32 entrains additional air from channel 24 and thus increases the flow through channel 24. The flow through channel 24 provides a flow through turbine 22 to operate compressor 28 to increase the pressure in flow channel 30. This increases the flow through ejector nozzle 26 to further increase the flow in channel 24 and also to increase the flow through turbine 22. This increases the flow through the compressor to further increase the pressure in flow channel 30. This continues until an equilibrium condition has been reached. Air removed from the attic by the evacuation system 10 will be replaced in a conventional manner by cool air through vents, not shown.

There is thus provided an attic evacuation system which requires no electrical power.

I claim:

1. An attic exhaust system adapted to be supported on the roof of a building having an attic, comprising: a diffuser nozzle; an ejector nozzle positioned within the diffuser nozzle and having its nozzle adjacent the throat of the diffuser nozzle; an attic vent; means, connected between said attic vent and said diffuser nozzle, for providing a first air flow channel between the attic vent and the diffuser nozzle; means, connected between said attic vent and said ejector nozzle, for providing a second air flow channel between the attic vent and the ejector nozzle; a turbine rotor within said first flow channel; means, connected to turbine rotor, for supplying compressed air to said second flow channel; means for admitting solar radiation energy to said second flow channel; means, within said second flow channel, for absorbing solar energy radiation, whereby the air in said second flow channel is heated by radiant energy absorbed by the solar energy radiation absorbing means.

2. The device as recited in claim 1 wherein said radiation energy absorbing means includes a plurality of solar energy absorbing vanes positioned within the second flow channel.

3. The device as recited in claim 2 including means, between the first flow channel and the second for heating air in the second air flow channel in response to solar radiation absorbed by solar energy absorbing vanes in the first air flow channel.

4. The device as recited in claim 3 wherein said means for heating air in the second air flow channel includes a heat transfer wall secured to the solar energy absorbing vanes.

* * * * *